US012776650B2

(12) United States Patent

Cao et al.

(10) Patent No.: US 12,776,650 B2
(45) Date of Patent: Oct. 27, 2026

(54) SYNCHRONOUS GRID-CONNECTED WIND-SOLAR-STORAGE HYBRID POWER GENERATION SYSTEM AND WORKING METHOD THEREOF

(71) Applicant: SHANDONG UNIVERSITY, Jinan (CN)

(72) Inventors: Yongji Cao, Jinan (CN); Hengxu Zhang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 733 days.

(21) Appl. No.: 18/016,080

(22) PCT Filed: Feb. 23, 2022

(86) PCT No.: PCT/CN2022/077499

§ 371 (c)(1),
(2) Date: Apr. 26, 2024

(87) PCT Pub. No.: WO2023/108891

PCT Pub. Date: Jun. 22, 2023

(65) Prior Publication Data

US 2025/0279653 A1 Sep. 4, 2025

(30) Foreign Application Priority Data

Dec. 15, 2021 (CN) ......................... 202111534492.9

(51) Int. Cl.

*H02J 3/38* (2026.01)
*H02J 3/28* (2006.01)
(Continued)

(52) U.S. Cl.

CPC ................ *H02J 3/381* (2013.01); *H02J 3/28* (2013.01); *H02J 3/00142* (2026.01);
(Continued)

(58) Field of Classification Search

CPC .......... H02J 3/381; H02J 3/28; H02J 3/00142; H02J 2101/24; H02J 2101/28;
(Continued)

(56) References Cited

FOREIGN PATENT DOCUMENTS

| | | |
|---|---|---|
| CN | 102510089 A | 6/2012 |
| CN | 104701891 A | 6/2015 |

(Continued)

OTHER PUBLICATIONS

Aug. 31, 2022 Search Report issued in International Patent Application No. PCT/CN2022/077499.

(Continued)

*Primary Examiner* — Mohammad Ali
*Assistant Examiner* — Sheela Rao
(74) *Attorney, Agent, or Firm* — Oliff PLC

(57) ABSTRACT

A synchronous grid-connected wind-solar-storage hybrid power generation system and a working method thereof includes: a wind power generation module, including a wind power generation device, and a first and second power electronic converter electrically connected to the device, respectively; a photovoltaic power generation module, including a photovoltaic power generation device, and a third and fourth power electronic converter electrically connected to the device, respectively; an energy storage module, including an energy storage device and a fifth power electronic converter electrically connected, the device being further electrically connected to the second and fourth power electronic converter, respectively; a grid connection module, a first end electrically connected to the first, third and fifth power electronic converters, and a second end connected to a power grid; and, a monitoring and control device electrically connected with the wind power generation module, photovoltaic power generation module, energy storage module and grid connection module, respectively.

10 Claims, 4 Drawing Sheets

(51) Int. Cl.

| | |
|---|---|
| *H02J 3/0014* | (2026.01) |
| *H02J 101/24* | (2026.01) |
| *H02J 101/28* | (2026.01) |
| *H02J 101/40* | (2026.01) |

(52) U.S. Cl.
CPC ....... *H02J 2101/24* (2026.01); *H02J 2101/28* (2026.01); *H02J 2101/40* (2026.01)

(58) Field of Classification Search
CPC .. H02J 2101/40; H02J 3/32; H02J 3/38; H02J 3/48; Y02E 10/56; Y02E 10/76; Y02E 70/30
See application file for complete search history.

(56) References Cited

FOREIGN PATENT DOCUMENTS

| | | | | | | |
|---|---|---|---|---|---|---|
| CN | 113690946 | A | | 11/2021 | | |
| CN | 114204601 | A | * | 3/2022 | .......... | H02J 3/00142 |
| WO | 2017/056114 | A1 | | 4/2017 | | |

OTHER PUBLICATIONS

Aug. 31, 2022 Written Opinion of the International Searching Authority issued in International Patent Application No. PCT/CN2022/077499.

* cited by examiner

SYNCHRONOUS GRID-CONNECTED WIND-SOLAR-STORAGE HYBRID POWER GENERATION SYSTEM AND WORKING METHOD THEREOF

CROSS-REFERENCES TO RELATED APPLICATIONS

This application claims priority benefits to Chinese Patent Application No. 202111534492.9, filed 15 Dec. 2021, the contents of which are incorporated herein by reference.

TECHNICAL FIELD

The present invention belongs to the technology field of new energy generation, and particularly relates to a synchronous grid-connected wind-solar-storage hybrid power generation system and a working method thereof.

BACKGROUND

The statements in this section merely provide background technical information related to the present invention and do not necessarily constitute prior art.

The energy transition has driven renewable energy sources, represented by wind power and photovoltaic power, to connect to the power grid and replace traditional thermal power units, resulting in increased difficulty in control of the active power of the power grid and greater challenges in control of frequency stability. First of all, wind power and photovoltaic power have inherent volatility; the power output is easily affected by the primary side wind speed and the solar radiation intensity. Secondly, wind power and photovoltaic power mostly operate in the maximum power tracking mode without the active power reserve, and the internal rotating devices do not store enough mechanical energy to effectively participate in the active power response of the power grid. Wind power and photovoltaic power are mostly grid-connected through power electronics, which do not participate in inertial response and primary frequency regulation, and have weak anti-interference, and are prone to large-scale chain outage after disturbance accidents, and face serious challenges in the control of frequency stability. Under such a general background, improving the performance of wind power generation systems and photovoltaic power generation systems and enhancing their grid-friendliness has become an urgent problem in the field of new energy generation.

At present, by using the complementarity of the power generation outputs of the wind power and photovoltaic power, the wind-solar hybrid power generation system can be constructed by coordinating the wind power and photovoltaic power, which can stabilize the output fluctuation to a certain extent. Energy storage is configured in the wind-solar hybrid power generation system to form the wind-solar-storage hybrid power generation system, which can further restrain output fluctuation and enhance active power reserve inside the system. The active power response of the synchronous unit can be simulated through the power electronic grid-connected devices of the wind-solar-storage hybrid power generation system by using a reasonable control strategy, but the internal moment of inertia of the wind-solar-storage hybrid power generation system mainly depends on the storage of the wind turbine and the asynchronous generator, is relatively small, and the problem of weak disturbance immunity of the power electronic grid-connected device is prominent, so that the wind-solar-storage hybrid power generation system is prone to occur chain outage after a disturbance accident, not only cannot provide effective active power support for the power grid, but also will aggravate the severity of the accident.

SUMMARY

For overcoming the problems mentioned above, the present invention provides a synchronous grid-connected wind-solar-storage hybrid power generation system and a working method thereof, using an energy storage device to further suppress an output fluctuation and utilizing the complementarity of wind power and photovoltaic power generation to stabilize the output fluctuation; increasing an internal active power reserve of the power generation system by configuring energy storage devices and rotating devices, and enhancing an ability thereof to provide active power support for the large power grid after a disturbance accident; by adopting a mode of the synchronous grid connection, can better participate in the inertia response and primary frequency regulation, and having strong anti-interference for reducing the occurrence of chain outage, so as to realize the synchronous grid connection of wind-solar-storage hybrid power generation system.

According to some examples, it is a first solution of the present invention to provide a synchronous grid-connected wind-solar-storage hybrid power generation system, adopting the following technical solution.

The synchronous grid-connected wind-solar-storage hybrid power generation system, comprising:

- a wind power generation module, comprising a wind power generation device, and a first power electronic converter and a second power electronic converter electrically connected to the wind power generation device, respectively;
- a photovoltaic power generation module, comprising a photovoltaic power generation device, and a third power electronic converter and a fourth power electronic converter electrically connected to the photovoltaic power generation device, respectively;
- an energy storage module, comprising an energy storage device and a fifth power electronic converter electrically connected, the energy storage device is further electrically connected to the second power electronic converter and the fourth power electronic converter, respectively;
- a grid connection module, a first end thereof is electrically connected to the first power electronic converter, the third power electronic converter and the fifth power electronic converter, and a second end thereof is connected to a power grid; and
- a monitoring and control device, being electrically connected with the wind power generation module, the photovoltaic power generation module, the energy storage module and the power grid connection module, respectively, and configured to set control parameters of the wind power generation module, the photovoltaic power generation module and the energy storage module, and adjust a working state of the energy storage module by judging a logical relationship between an on-grid power of the power generation, a generated output of the wind power generation device and a generated output of the photovoltaic power generation device, for the synchronous grid connection of the wind-solar-storage hybrid power generation system.

As a further technical limitation, the wind power generation device comprises a wind turbine, a gearbox and an asynchronous generator connected in sequence.

As a further technical limitation, the grid connection module comprises a DC motor and a synchronous power generation device electrically connected, the synchronous power generation device comprises a synchronous generator and an excitation unit electrically connected.

Further, the monitoring and control device comprises a monitoring module, a display module, and a control module connected to the monitoring module and the display module, respectively.

Further, the control module is electrically connected with the wind power generation device, the first power electronic converter, the second power electronic converter, the photovoltaic power generation device, the third power electronic converter, the fourth power electronic converter, and the fifth power electronic converter, respectively; the monitoring module is electrically connected with the wind power generation device, the first power electronic converter, the second power electronic converter, and the photovoltaic power generation device, the third power electronic converter, the fourth power electronic converter, the fifth power electronic converter, the energy storage module, the DC motor, the synchronous generator and the excitation unit, respectively.

According to some examples, it is a second solution of the present invention to provide a working method of a synchronous grid-connected wind-solar-storage hybrid power generation system, using the synchronous grid-connected wind-solar-storage hybrid power generation system provided in the first solution, and adopting the following technical solution.

The working method of the synchronous grid-connected wind-solar-storage hybrid power generation system, comprising the steps of:

- obtaining a generated output of a wind power generation device, a generated output of a photovoltaic power generation device and an on-grid power of a power grid;
- combining control parameters of a wind-solar-storage hybrid power generation system to obtain a first charging starting power of an energy storage device and a second charging starting power of the energy storage device; and
- determining relationships between the on-grid power of the power grid and the first charging starting power of the energy storage device, and the second charging starting power of the energy storage device, respectively, to obtain a working state of the energy storage device and to carry out a synchronous grid connection of a wind-solar-storage hybrid power generation system.

As a further technical limitation, obtaining the generated output of the wind power generation device, the generated output of the photovoltaic power generation device, and the on-grid power of the power grid specified by the dispatch center, and then obtaining an operating power of the energy storage device calculated by using the obtained three powers.

As a further technical limitation, the control parameters of the wind-solar-storage hybrid power generation system comprise an energy transfer coefficient $c_w$ from the wind power generation device to the synchronous power generation device, an energy transfer coefficient $c_s$ from the photovoltaic power generation device to the synchronous power generation device, an energy transfer coefficient $c_b$ from the energy storage device to the synchronous power generation device, an energy conversion efficiency $c_t$ from the synchronous power generation device to the power grid, an energy transfer coefficient $c_c$ from the wind power generation device to the energy storage device, and an energy transfer coefficient $c_a$ from the photovoltaic power generation device to the energy storage device.

As a further technical limitation, the first charging starting power of the energy storage device is determined by the generated output of the wind power generation device, the transfer efficiency of energy transfers from the wind power generation device to the synchronous power generation device and the conversion efficiency of energy converts from the synchronous power generation device to the power grid; the second charging starting power of the energy storage device is determined by the generated output of the wind power generation device, the transfer efficiency of energy transfers from the wind power generation device to the synchronous power generation device, the conversion efficiency of energy converts from the synchronous power generation device to the power grid, the generated output of the photovoltaic power generation device and the transfer efficiency of energy transfers from the photovoltaic power generation device to the synchronous power generation device.

As a further technical limitation, when the on-grid power of the power grid is not greater than the first charging starting power of the energy storage device, the wind power generation device charges the energy storage device through the second power electronic converter and the photovoltaic power generation device through the fourth power electronic converter at the same time, so the energy storage device is in the charging state, and affected by the on-grid power of the power grid, the photovoltaic power generation device does not provide power for the DC motor, and the DC motor only receives the electric energy provided by the wind power generation device through the first power electronic converter;

- when the on-grid power of the power grid is between the first charging starting power of the energy storage device and the second charging starting power of the energy storage device, the photovoltaic power generation device charges the energy storage device through the fourth power electronic converter, so the energy storage device is in the charging state, and affected by the on-grid power of the power grid, the photovoltaic power generation device does not provide power for the energy storage device, and the DC motor receives the electric energies provided by the wind power generation device through the first power electronic converter and the photovoltaic power generation device through the third power electronic converter at the same time; and
- when the on-grid power of the power grid is greater than the second charging starting power of the energy storage device, affected by the on-grid power of the power grid, the energy storage device is in a discharging state, and the DC motor receives the electric energies provided by the wind power generation device through the first power electronic converter, the photovoltaic power generation device through the third power electronic converter and the energy storage device through the fifth power electronic converter at the same time.

Compared with the prior arts, the beneficial effects of the present invention are as follows:

1. The present invention, as a new energy generation system, can realize the synchronized grid connection of wind-solar-storage hybrid power generation system, and on the basis of utilizing the complementarity of wind power and photovoltaic power generation to stabilize the output fluctuations, use energy storage devices to further suppress the output fluctuations; it can increase the internal active power reserve of the power generation system by configuring the energy storage device and the rotating device, and enhance an ability thereof to provide active power support for the large power grid after disturbance accidents; it adopts the synchronous grid connection mode, can better participate in inertia response and primary frequency modulation control, and having strong anti-interference for reducing the occurrence of chain outage.

2. The present invention is simple to install, convenient to apply in upgrading the existing new energy generation system, and suitable for mass promotion; the equivalent inertia and active power backup provided in the present invention can replace the inertia and backup of thermal power units in the power grid to a certain extent, reduce the startup quantity of thermal power units, and have certain economic benefits.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

The present invention will now be further described with reference to the accompanying drawings and examples.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the context clearly dictates otherwise. In addition, it should further be understood that, terms "comprise" and/or "comprising" used in this specification indicate that there are features, steps, operations, devices, components, and/or combinations thereof.

The examples and features of the examples in the present invention may be combined with each other without conflict.

Example 1

The example 1 of the present invention provides a synchronous grid-connected wind-solar-storage hybrid power generation system.

Figure 1:
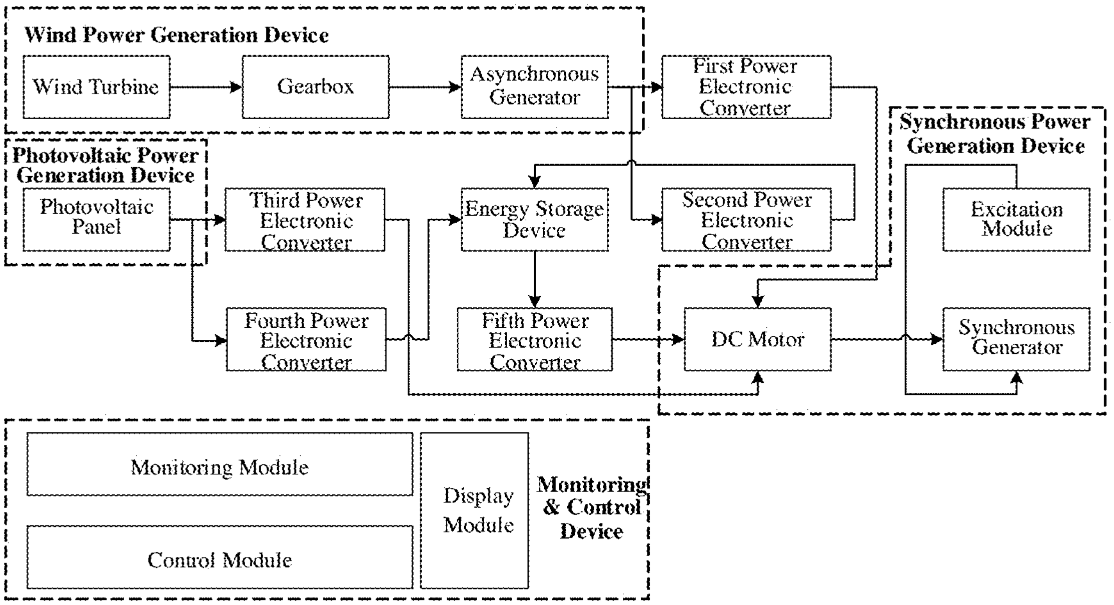
FIG. 1 is a schematic diagram of a structure of a synchronous grid-connected wind-solar-storage hybrid power generation system in Example 1 of the present invention.

The synchronous grid-connected wind-solar-storage hybrid power generation system as shown in FIG. 1 comprises: a wind power generation device, a photovoltaic power generation device, a first power electronic converter, a second power electronic converter, a third power electronic converter, a fourth power electronic converter, a fifth power electronic converter, an energy storage device, a synchronous power generation device, and a monitoring and control device.

Specifically, the wind power generation device comprises a wind turbine, a gearbox and an asynchronous generator; the photovoltaic power generation device comprises a photovoltaic panel; the synchronous power generation device comprises a DC motor, a synchronous generator and an excitation module; and the monitoring and control device comprises a monitoring module, a control module and a display module.

The wind power generation device is connected to the first power electronic converter and the second power electronic converter; the wind turbine, the gearbox and the asynchronous generator are connected in sequence; the photovoltaic power generation device is connected to the third power electronic converter and the fourth power electronic converter; the first power electronic converter is connected to the synchronous power generation device; the second power electronic converter is connected to the energy storage device; the third power electronic converter is connected to the synchronous power generation device; the fourth power electronic converter is connected to the energy storage device; the energy storage device is connected at each end to the second power electronic converter, the fourth power electronic converter and the fifth power electronic converter; the fifth power electronic converter is connected to the synchronous power generation device; the synchronous power generation device is connected at each end to the first power electronic converter, the second power electronic converter, the fifth power electronic converter and the power grid; the monitoring and control device is connected to the wind power generation device, the photovoltaic power generation device, the first power electronic converter, the second power electronic converter, the third power electronic converter, the fourth power electronic converter, the fifth power electronic converter, the energy storage device and the synchronous power generation device.

In the present example, the wind power generation device is capable of converting wind energy into AC electrical energy; the gearbox is capable of adjusting the speed of the asynchronous generator; the photovoltaic power generation device is capable of converting solar energy into DC electrical energy; the first power electronic converter is capable of converting the AC electrical energy generated by the wind power generation device into DC electrical energy required by the synchronous power generation device; the second power electronic converter is capable of converting the AC electrical energy generated by the wind power generation device into the DC electrical energy required by the energy storage device; the third power electronic converter is capable of converting the DC electrical energy generated by the photovoltaic power generation device into the DC electrical energy required by the synchronous power generation device; the fourth power electronic converter is capable of converting the AC electrical energy generated by the photovoltaic power generation device into the DC electrical energy required by the energy storage device; the energy storage device is capable of converting the DC electrical energy transmitted by the second power electronic converter and the fourth power electronic converter to a chemical energy for storage, and capable of converting internally stored chemical energy to the DC electrical energy; the fifth power electronic converter is capable of converting the DC electrical energy released by the energy storage device to the DC electrical energy required by the synchronous power generation device; the synchronous power generation device is capable of converting the DC electrical energy transmitted by the first power electronic converter, the third power electronic converter and the fifth power electronic converter to the AC electrical energy and transmitting it to the power grid; the excitation module is capable of regulating a grid-connected voltage of the synchronous generator; the monitoring and control device is capable of monitoring and displaying the relevant parameters and of controlling them accordingly.

Example 2

The example 2 of the present invention provides a working method of a synchronous grid-connected wind-solar-storage hybrid power generation system.

The working method of the synchronous grid-connected wind-solar-storage hybrid power generation system, comprising the steps of:

- obtaining a generated output of a wind power generation device, a generated output of a photovoltaic power generation device and an on-grid power of a power grid;
- combining control parameters of a wind-solar-storage hybrid power generation system to obtain a first charging starting power of an energy storage device and a second charging starting power of the energy storage device; and
- determining relationships between the on-grid power of the power grid and the first charging starting power of the energy storage device, and the second charging starting power of the energy storage device, respectively, to obtain a working state of the energy storage device and to carry out a synchronous grid connection of a wind-solar-storage hybrid power generation system.

Figure 2:
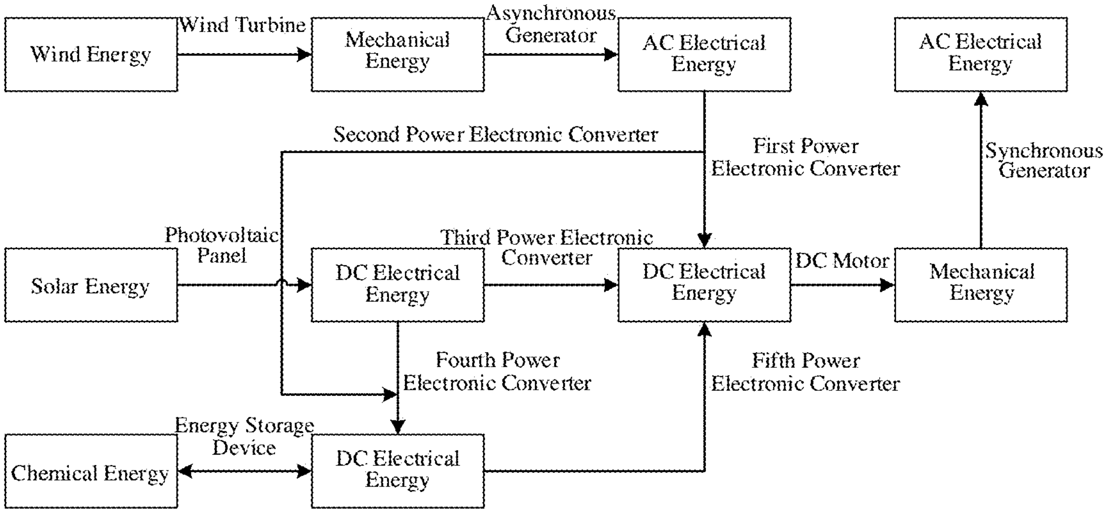
FIG. 2 is a schematic diagram of an energy conversion process of a synchronous grid-connected wind-solar-storage hybrid power generation method of Example 2 of the present invention.

As shown in FIG. 2, a wind turbine converts a wind energy into a mechanical energy and transmits it to an asynchronous generator; the asynchronous generator converts the mechanical energy into an AC electrical energy; the photovoltaic panel converts a solar energy into a DC electrical energy; a first power electronic converter converts the AC electrical energy generated by the asynchronous generator into a DC electrical energy required by a DC motor; a second power electronic converter converts the AC electrical energy generated by the asynchronous generator into a DC electrical energy required by an energy storage device; a third power electronic converter converts the DC electrical energy generated by the photovoltaic panel into the DC electrical energy required by the DC motor; a fourth power electronic converter converts the DC electrical energy generated by the photovoltaic panel into the DC electrical energy required by the energy storage device; the energy storage device converts the DC electrical energy transmitted by the second power electronic converter and the fourth power electronic converter into a chemical energy for storing; the energy storage device converts the chemical energy into the DC electrical energy; a fifth power electronic converter converts the DC electrical energy released by the energy storage device into the DC electrical energy required by the DC motor; the DC motor converts the DC electrical energy into the mechanical energy; the synchronous generator converts the mechanical energy into the AC electrical energy.

A power relationship between the wind power generation device, the photovoltaic power generation device, the energy storage device and the power grid is as follows:

$$P_G = (P_W \cdot c_w + P_S \cdot c_s + P_B \cdot c_b) \cdot c_t$$

wherein, $P_G$ is the on-grid power; $P_W$ is the generated output of the wind power generation device; $P_S$ is the generated output of the photovoltaic power generation device; $P_B$ is the operating power of the energy storage device; $c_w$ is the energy transfer coefficient from the wind power generation device to the synchronous power generation device; $c_s$ is the energy transfer coefficient from the photovoltaic power generation device to the synchronous power generation device; $c_b$ is the energy transfer coefficient from the energy storage device to the synchronous power generation device; $c_t$ is the energy conversion efficiency from the synchronous power generation device to the power grid.

Figure 3:
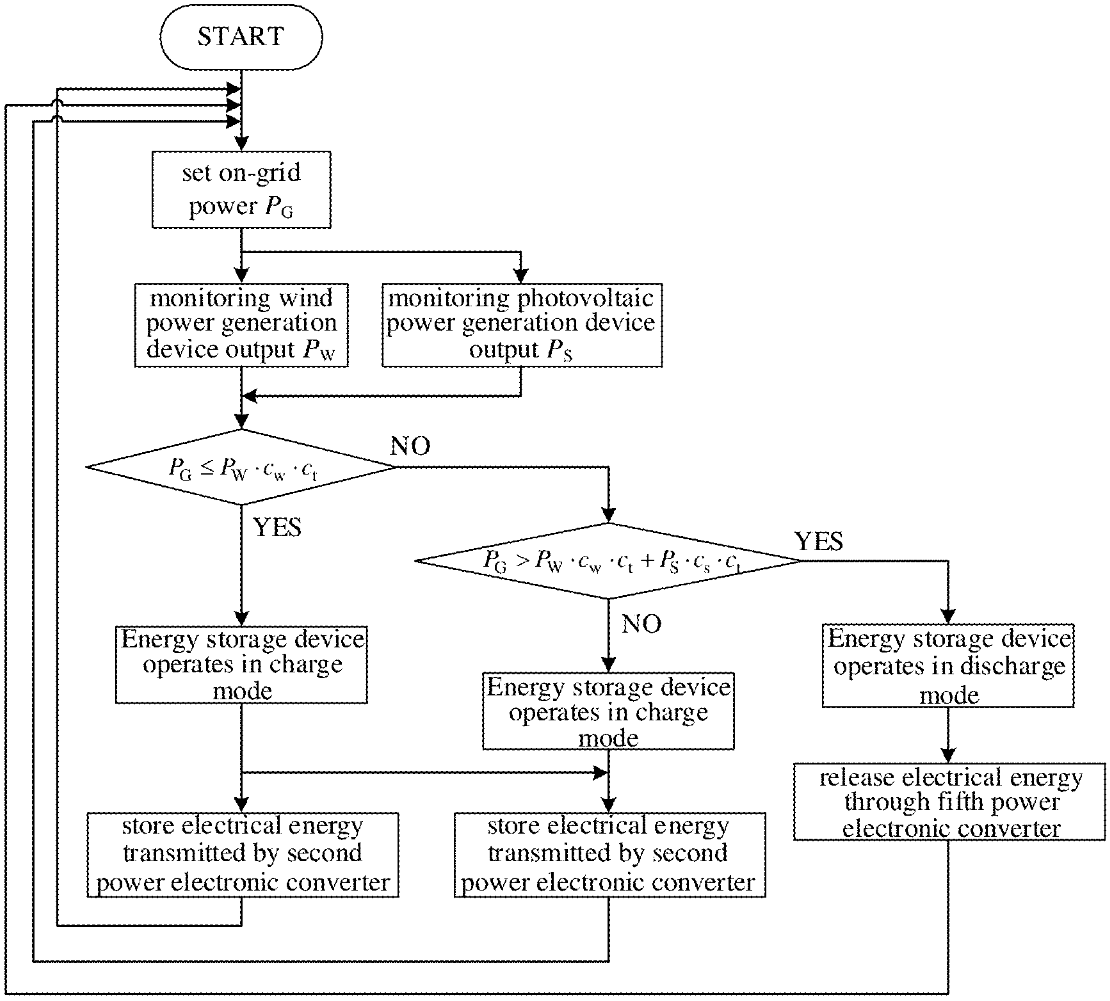
FIG. 3 is a flowchart of a process of adjusting an operating power of an energy storage device of Example 2 of the present invention.

As shown in FIG. 3, the energy storage device adjusts the operating power $P_B$ thereof based on the generated output $P_W$ of the wind power generation device, the generated output $P_S$ of the photovoltaic power generation device and the specified on-grid power $P_G$ of power generation, that is:

$$P_B = \begin{cases} P_W \cdot c_a + P_S \cdot c_c - \dfrac{P_G \cdot c_a}{c_t \cdot c_w} & P_G \le P_W \cdot c_w \cdot c_t \\ \dfrac{P_W \cdot c_w \cdot c_c}{c_s} + P_S \cdot c_c - \dfrac{P_G \cdot c_c}{c_t \cdot c_s} & P_W \cdot c_w \cdot c_t < P_G \le \\ & P_W \cdot c_w \cdot c_t + P_S \cdot c_s \cdot c_t \\ \dfrac{P_W \cdot c_w \cdot c_t + P_S \cdot c_s \cdot c_t - P_G}{c_b \cdot c_t} & P_G > P_W \cdot c_w \cdot c_t + P_S \cdot c_s \cdot c_t \end{cases}$$

Wherein, $c_c$ is the energy transfer efficiency coefficient from the wind power generation device to the energy storage device, and $c_a$ is the energy transfer coefficient from the photovoltaic power generation device to the energy storage device.

Further, when the on-grid power of the power grid is not greater than the first charging starting power of the energy storage device, i.e., $P_G \le P_W \cdot c_w \cdot c_t$, the wind power generation device and the photovoltaic power generation device charge the energy storage device at the same time, and the energy storage device operates in a charge mode and stores the electrical energy $$P_W \cdot c_a + P_S \cdot c_c - \frac{P_G \cdot c_a}{c_t \cdot c_w}$$

transmitted by the second power electronic converter and the fourth power electronic converter;

when the on-grid power of the power grid is between the first charging starting power of the energy storage device and the second charging starting power of the energy storage device, i.e., $P_W \cdot c_w \cdot c_t < P_G \leq P_W \cdot c_w \cdot c_t + P_S \cdot c_s \cdot c_t$, the photovoltaic power generation device charges the energy storage device, and the energy storage device operates in the charge mode and stores the electrical energy $$\frac{P_W \cdot c_w \cdot c_c}{c_s} + P_S \cdot c_c - \frac{P_G \cdot c_c}{c_t \cdot c_s}$$

transmitted by the fourth power electronic converter;

when the on-grid power of the power grid is greater than the second charging starting power of the energy storage device, i.e., $P_G > P_W \cdot c_w \cdot c_t + P_S \cdot c_s \cdot c_t$, the energy storage device operates in the discharge mode and releases the electrical energy $$\frac{P_W \cdot c_w \cdot c_t + P_S \cdot c_s \cdot c_t - P_G}{c_b \cdot c_t}$$

through the fifth power electronic convertor.

Figure 4:
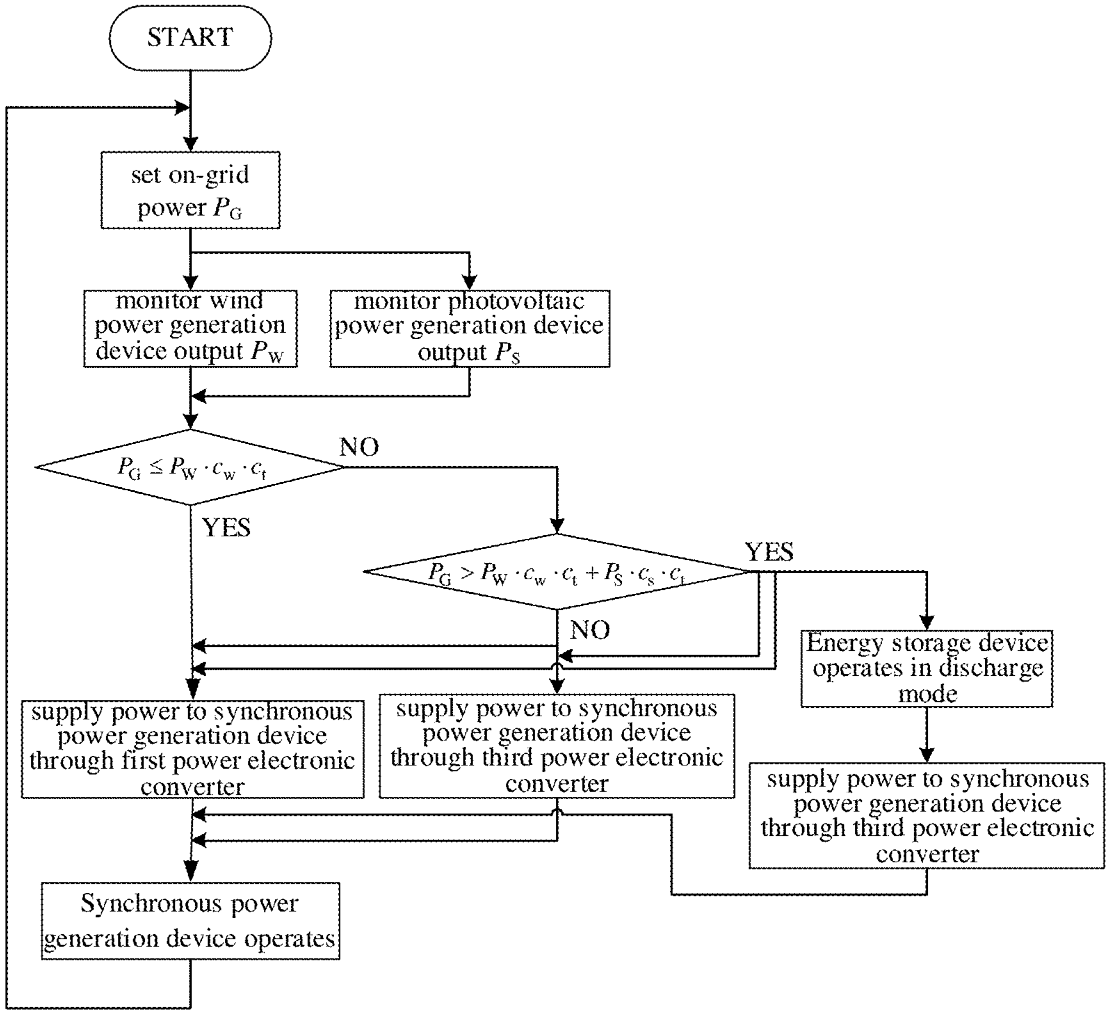
FIG. 4 is a flowchart of a process of judging a receiving power of a synchronous power generation device of Example 2 of the present invention.

As shown in FIG. 4, when $P_G \leq P_W \cdot c_w \cdot c_t$, the synchronous power generation device is powered by the wind power generation device and receives only the electrical energy transmitted by the first power electronic converter; when $P_W \cdot c_w \cdot c_t < P_G \leq P_W \cdot c_w \cdot c_t + P_S \cdot c_s \cdot c_t$, the synchronous power generation device is jointly powered by the wind power generation device and the photovoltaic power generation device and receives the electrical energy transmitted by the first power electronic converter and the third power electronic converter; when $P_G > P_W \cdot c_w \cdot c_t + P_S \cdot c_s \cdot c_t$, the synchronous power generation device is jointly powered by the wind power generation device, the photovoltaic power generation device and the energy storage device and receives the electrical energy transmitted by the first power electronic converter, the third power electronic converter and the fifth power electronic converter.

Figure 5:
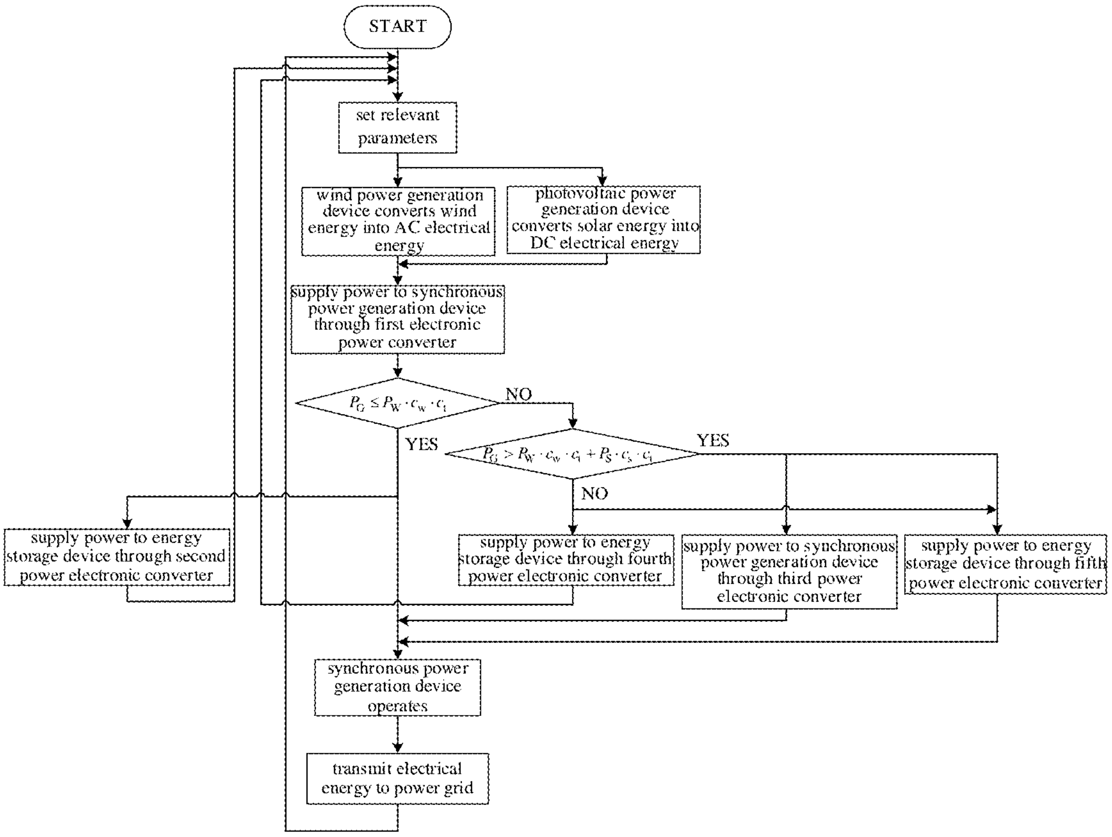
FIG. 5 is a flowchart of the synchronous grid-connected wind-solar-storage hybrid power generation method of Example 2 of the present invention.

As shown in FIG. 5, the user sets the relevant operating parameters of the present invention through the monitoring and control device; the wind power generation device converts the wind energy into the AC electrical energy, and the photovoltaic power generation device converts the solar energy into the DC electrical energy; when $P_G \leq P_W \cdot c_w \cdot c_t$, the wind power generation device supplies power to the synchronous power generation device through the first power electronic converter, and supplies power to the energy storage device through the second power electronic converter, and the photovoltaic power generation device supplies power to the energy storage device through the fourth power electronic converter; when $P_W \cdot c_w \cdot c_t < P_G \leq P_W \cdot c_w \cdot c_t + P_S \cdot c_s \cdot c_t$, the wind power generation device supplies power to the synchronous power generation device through the first power electronic converter, the photovoltaic power generation device supplies power to the synchronous power generation device through the third power electronic converter and supplies power to the energy storage device through the fourth power electronic converter; when $P_G > P_W \cdot c_w \cdot c_t + P_S \cdot c_w \cdot c_t$, the wind power generation device supplies power to the synchronous power generation device through the first power electronic converter, the photovoltaic power generation device supplies power to the synchronous power generation device through the third power electronic converter, the energy storage device supplies power to the synchronous power generation device through the fourth power electronic converter; the synchronous power generation device generates the AC electrical energy and transmits it to the power grid.

Although the specific embodiments of the present invention are described above in combination with the accompanying drawings, it is not a limitation on the protection scope of the present invention. Those skilled in the art should understand that on the basis of the technical scheme of the present invention, various modifications or deformations that can be made by those skilled in the art without creative labor are still within the protection scope of the present invention.

What is claimed is:

1. A synchronous grid-connected wind-solar-storage hybrid power generation system, comprising:

a wind power generation module, comprising a wind power generation device, and a first power electronic converter and a second power electronic converter electrically connected to the wind power generation device, respectively;

a photovoltaic power generation module, comprising a photovoltaic power generation device, and a third power electronic converter and a fourth power electronic converter electrically connected to the photovoltaic power generation device, respectively;

an energy storage module, comprising an energy storage device and a fifth power electronic converter electrically connected, the energy storage device is further electrically connected to the second power electronic converter and the fourth power electronic converter, respectively;

a grid connection module, a first end thereof is electrically connected to the first power electronic converter, the third power electronic converter and the fifth power electronic converter, and a second end thereof is connected to a power grid;

a monitoring and control device, being electrically connected with the wind power generation module, the photovoltaic power generation module, the energy storage module and the power grid connection module, respectively, and configured to set control parameters of the wind power generation module, the photovoltaic power generation module and the energy storage module, and adjust a working state of the energy storage module by judging a logical relationship between an on-grid power of the power generation, a generated output of the wind power generation device and a generated output of the photovoltaic power generation device, for the synchronous grid connection of the wind-solar-storage hybrid power generation system.

2. The synchronous grid-connected wind-solar-storage hybrid power generation system according to claim 1, wherein the wind power generation device comprises a wind turbine, a gearbox and an asynchronous generator connected in sequence.

3. The synchronous grid-connected wind-solar-storage hybrid power generation system according to claim 1, wherein the grid connection module comprises a DC motor and a synchronous power generation device electrically connected, the synchronous power generation device comprises a synchronous generator and an excitation unit electrically connected.

4. The synchronous grid-connected wind-solar-storage hybrid power generation system according to claim 3, wherein the monitoring and control device comprises a monitoring module, a display module, and a control module connected to the monitoring module and the display module, respectively.

5. The synchronous grid-connected wind-solar-storage hybrid power generation system according to claim 4, wherein the control module is electrically connected with the wind power generation device, the first power electronic converter, the second power electronic converter, the photovoltaic power generation device, the third power electronic converter, the fourth power electronic converter, and the fifth power electronic converter, respectively; the monitoring module is electrically connected with the wind power generation device, the first power electronic converter, the second power electronic converter, and the photovoltaic power generation device, the third power electronic converter, the fourth power electronic converter, the fifth power electronic converter, the energy storage module, the DC motor, the synchronous generator and the excitation unit, respectively.

6. A working method of a synchronous grid-connected wind-solar-storage hybrid power generation system, adopting a synchronous grid-connected wind-solar-storage hybrid power generation system of claim 1, comprising:

obtaining a generated output of a wind power generation device, a generated output of a photovoltaic power generation device and an on-grid power of a power grid;

combining control parameters of a wind-solar-storage hybrid power generation system to obtain a first charging starting power of an energy storage device and a second charging starting power of the energy storage device; and determining relationships between the on-grid power of the power grid and the first charging starting power of the energy storage device, and the second charging starting power of the energy storage device, respectively, to obtain a working state of the energy storage device and to carry out a synchronous grid connection of a wind-solar-storage hybrid power generation system.

7. The working method of the synchronous grid-connected wind-solar-storage hybrid power generation system according to claim 6, wherein obtaining the generated output of the wind power generation device, the generated output of the photovoltaic power generation device, and the on-grid power of the power grid specified by a dispatch center, and then obtaining an operating power of the energy storage device calculated by using the obtained three powers.

8. The working method of the synchronous grid-connected wind-solar-storage hybrid power generation system according to claim 6, wherein the control parameters of the wind-solar-storage hybrid power generation system comprise an energy transfer coefficient $c_w$ from the wind power generation device to the synchronous power generation device, an energy transfer coefficient $c_s$ from the photovoltaic power generation device to the synchronous power generation device, an energy transfer coefficient $c_b$ from the energy storage device to the synchronous power generation device, an energy conversion efficiency $c_t$ from the synchronous power generation device to the power grid, an energy transfer coefficient $c_c$ from the wind power generation device to the energy storage device, and an energy transfer coefficient $c_a$ from the photovoltaic power generation device to the energy storage device.

9. The working method of the synchronous grid-connected wind-solar-storage hybrid power generation system according to claim 6, wherein the first charging starting power of the energy storage device is determined by the generated output of the wind power generation device, the transfer efficiency of energy transfers from the wind power generation device to the synchronous power generation device and the conversion efficiency of energy converts from the synchronous power generation device to the power grid; the second charging starting power of the energy storage device is determined by the generated output of the wind power generation device, the transfer efficiency of energy transfers from the wind power generation device to the synchronous power generation device, the conversion efficiency of energy converts from the synchronous power generation device to the power grid, the generated output of the photovoltaic power generation device and the transfer efficiency of energy transfers from the photovoltaic power generation device to the synchronous power generation device.

10. The working method of the synchronous grid-connected wind-solar-storage hybrid power generation system according to claim 6, wherein, when the on-grid power of the power grid is not greater than the first charging starting power of the energy storage device, the wind power generation device charges the energy storage device through the second power electronic converter and the photovoltaic power generation device through the fourth power electronic converter at the same time, so the energy storage device is in the charging state, and affected by the on-grid power of the power grid, the photovoltaic power generation device does not provide power for the DC motor, and the DC motor only receives the electric energy provided by the wind power generation device through the first power electronic converter;

when the on-grid power of the power grid is between the first charging starting power of the energy storage device and the second charging starting power of the energy storage device, the photovoltaic power generation device charges the energy storage device through the fourth power electronic converter, so the energy storage device is in the charging state, and affected by the on-grid power of the power grid, the wind power generation device does not provide power for the energy storage device, and the DC motor receives the electric energies provided by the wind power generation device through the first power electronic converter and the photovoltaic power generation device through the third power electronic converter at the same time; and when the on-grid power of the power grid is greater than the second charging starting power of the energy storage device, affected by the on-grid power of the power grid, the energy storage device is in a discharging state, and the DC motor receives the electric energies provided by the wind power generation device through the first power electronic converter, the photovoltaic power generation device through the third power electronic converter and the energy storage device through the fifth power electronic converter at the same time.

* * * * *